United States Patent
Singh et al.

(10) Patent No.: US 8,493,883 B2
(45) Date of Patent: Jul. 23, 2013

(54) IDENTIFYING AND ANALYZING NETWORK CONFIGURATION DIFFERENCES

(75) Inventors: Pradeep K. Singh, Arlington, VA (US); Alain J. Cohen, Washington, DC (US); Ankit Agarwal, Bethesda, MD (US)

(73) Assignee: Riverbed Technology, Inc., San Francisco, CA (US)

( * ) Notice: Subject to any disclaimer, the term of this patent is extended or adjusted under 35 U.S.C. 154(b) by 1077 days.

(21) Appl. No.: 11/505,228

(22) Filed: Aug. 16, 2006

(65) Prior Publication Data

US 2007/0058570 A1    Mar. 15, 2007

Related U.S. Application Data

(60) Provisional application No. 60/709,763, filed on Aug. 19, 2005, provisional application No. 60/709,773, filed on Aug. 19, 2005.

(51) Int. Cl.
*H04L 12/28* (2006.01)

(52) U.S. Cl.
USPC .......................................... 370/254; 709/224

(58) Field of Classification Search
None
See application file for complete search history.

(56) References Cited

U.S. PATENT DOCUMENTS

| 5,923,850 | A  | * | 7/1999 | Barroux | 709/224 |
| 6,282,175 | B1 | * | 8/2001 | Steele et al. | 370/254 |
| 2004/0093408 | A1 | * | 5/2004 | Hirani et al. | 709/224 |

* cited by examiner

*Primary Examiner* — Faruk Hamza
*Assistant Examiner* — Tito Pham
(74) *Attorney, Agent, or Firm* — Robert M. McDermott (57) ABSTRACT

A contextual and semantic analysis of network entities facilitates a mapping and comparison of the entities between network models. The system includes a plurality of refine handler and match handler pairs that use rules that are specific to the type of network entities being analyzed. The refine handler analyzes the network model to identify the entities for which its rules apply, and the match handler processes these identified entities to establish a pairing between corresponding entities in each model. A sequence of refine-match processes are applied to the network models, typically in accordance with a hierarchy of rules until each entity is identified as a matched, added, or removed entity. A difference handler processes the identified pairings to provide a difference analysis that facilitates a meaningful interpretation of the configuration changes, and a user interface provides an interactive environment to view the differences from different perspectives.

35 Claims, 6 Drawing Sheets

| Previous Network: AS-JUN-14 | Current Network: AS-JUL-15 | Date: 15 June 2006 |
|---|---|---|

| Executive Summary | | 420 / 505 Devices 560 |
|---|---|---|

| Devices | | |
|---|---|---|
| N | New Devices | |
| R | Removed Devices | |
| M | Modified Devices | |
| x | Routers | |
| x | Switches | |
| x | Firewalls | |

| Links | |
|---|---|
| N | New Links |
| R | Removed Links |
| M | Modified Links |

| Logical Groups | |
|---|---|
| x | IP Subsets |
| x | OSPF Areas |
| x | HSRP Groups |
| x | BGP ASes |
| x | HSRP Groups |
| x | BGP ASes |
| x | QoS Devices |
| x | AAA Devices |

98 Modified

| Hostname | Chassis Type | # of Changes | Summary of Changes |
|---|---|---|---|
| alt-cc-rtr-11 | Cisco 6509 | 10 | Addressing, BGP, AAA |
| ⋮ | | | |
| alt-cc-fw-01 | CheckPoint | 9 | Implied Rules, NAT |
| ⋮ | | | |
| bos-cc-sw-01 | Juniper M5 | 15 | OSPF Areas |

| Previous Network: AS-JUN-14 | Current Network: AS-JUL-15 | Date: 15 June 2006 |
|---|---|---|

| Executive Summary | alt-cc-rtr-11 (Cisco 6509) | | | | Collapse All  Expand All |
|---|---|---|---|---|---|

10 changes

| IP Subnets | | | | 3 changes |
|---|---|---|---|---|
| Assigned IP Addresses | | | | |
| Interface Name | Status | Net | Primary IP Address | Secondary IP Addresses |
| fastethernet0/0 | Active | Pre | 172.16.17.4/16 | None |
| | | Cur | 172.16.17.4/16 | 12.10.2.251/8 |
| serial0/0 | Active | Pre | 198.4.45.1/24 | None |
| | | Cur | 198.4.45.7/24 | 212.34.4.1/24 |

| BGP Configuration | 5 changes |
|---|---|

| AAA Configuration | 2 changes |
|---|---|

| View Configuration File Differences |
|---|

Executive Summary sidebar:

Devices
- N  New Devices
- R  Removed Devices
- M  Modified Devices
- x  Routers
  - alt-cc-rtr-11  *10 changes*
  - alt-rtr-01  *9 changes*
  - alt-rtr-03  *13 changes*
- x  Switches
- x  Firewalls Links
- N  New Links
- R  Removed Links
- M  Modified Links Logical Groups
- x  IP Subsets
- x  OSPF Areas
- x  HSRP Groups
- x  BGP ASes

FIG. 6

| Previous Network: AS-JUN-14 | Current Network: AS-JUL-15 | Date: 15 June 2006 |
|---|---|---|
| Executive Summary | 12.0.0.0/8 | |

Devices

| N | New Devices |
|---|---|
| R | Removed Devices |
| M | Modified Devices |

Links

| N | New Links |
|---|---|
| R | Removed Links |
| M | Modified Links |

Logical Groups

| x | IP Subsets |
|---|---|

| N | New<br>7 subnets |
|---|---|
| R | Removed<br>3 subnets |
| M | Modified<br>13 subnets |

12.0.0.0/8
*5 changes*

172.16.0.0/16
*5 changes*

198.4.45.0/24
*13 changes*

| x | OSPF Areas |
|---|---|
| x | HSRP Groups |
| x | BGP ASes |

5 changes
420

Interfaces Added

| Hostname | Interface | IP Address |
|---|---|---|
| alt-cc-rtr-11 | fastethernet0/0 | 12.10.2.251/8 |
| alt-rtr-01 | serial0/2 | 12.0.0.6/8 (secondary) |
| bos-sw-10 | vlan10 | 12.2.0.8/8 |

Interfaces Removed

| Hostname | Interface | IP Address |
|---|---|---|
| alt-rtr-03 | serial0/1 | 12.0.0.4/8 |
| bos-sw-11 | vlan11 | 12.2.0.7/8 |

IDENTIFYING AND ANALYZING NETWORK CONFIGURATION DIFFERENCES

This application claims the benefit of U.S. Provisional Patent Applications 60/709,763 and 60/709,773, each filed on 19 Aug. 2005.

BACKGROUND AND SUMMARY OF THE INVENTION

This invention relates to the field of network management and support, and in particular to a method and system that facilitates the identification and analysis of changes to the configuration of the network, and elements thereof.

The management of a communications network is a complex and time-consuming task, particularly as the size and capabilities of such networks continue to grow. Changes to the configuration of a network often cause problems that are difficult to anticipate or diagnose. Often, such problems remain latent until their compound effect cause network disruptions or other anomalous behavior.

Because of the demands placed upon typical networks, changes are often and continually made; equipment is added or removed, attributes associated with the equipment are adjusted, connections are rerouted, and so on. Ideally, each change is recorded and reported to the network manager, so that if a problem develops on the network, the manager can assess the changes that have been introduced, to identify potential causes. However, this ideal is rarely achieved, and when network problems develop, the typical network manager does not have a complete and/or up-to-date list, and must painstakingly generate one manually.

Also, network managers often use simulation tools to simulate the effect of proposed changes to the network, before the changes are actually made. Even in these cases, however, the complexity of a typical network is such that minor changes may be continually made and unmade throughout the network representation in such a way that it is not easy to build a final list of migration steps or to diagnose problems in the virtual network.

When a network is installed, a 'baseline' network description, or model, is typically created. The user provides the system with configuration and operational data about the devices in the network. Configuration data may include, for example, the device configuration file of the routers in the system, and operational data may include, for example, the output of the "show cdp neighbors detail" command on a network switch. The network model is preferably a high-fidelity representation of the actual network, and includes, for example, representations of the physical devices, physical links between devices, logical links (e.g., ATM PVCs) between devices, and so on. Each representation of a device, link, etc. contains its configuration and operational information, typically using an attribute-value pair structure. Although the network model is preferably organized as an integral set of data, for the purposes of this disclosure, a network model comprises any collection of data that represents a network, including a collection of 'raw data' from some or all of the network devices.

The baseline network model represents a stable point for the network. Whenever major changes are introduced, either in the simulated network or in the actual network, a new baseline is made. In some environments, daily or weekly baselines are also kept. When a network problem develops, the network manager compares the latest network model to the appropriate baseline to identify changes since the last known stable point. However, the network model for even a relatively small network may include hundreds of pages of description, and identifying such changes to diagnose a problem can be a time-consuming and frustrating process, particularly if the change included replacing a piece of equipment or modifying connectivity.

Conventional text-based "file-compare" programs are generally unsuitable for comparing and analyzing changes to a network model for a variety of reasons. Generally, a network model of the entire network does not exist as a single file, and comparing the configuration files of individual devices does not provide a complete picture of the overall effects of individual changes on the entire network. Additionally, some devices may not have text-based configuration files. Even if a complete network model were made available, using for example, an XML format, a comparison of two network models, whether performed manually or via a file-compare program, is particularly difficult if the two models are similar, but not exactly alike, because it is often difficult to distinguish among similar network entities to provide an appropriate one-to-one mapping between the entities in each network model. For example, a network may include dozens or hundreds of routers, and establishing a direct mapping of each router in one model to each router in the other model, based on differently structured network descriptions, may not be feasible. An automated text-based comparison process is further complicated by the fact that any and all differences are identified, regardless of the significance of the difference. For example, a change to a descriptive field, such as the serial number of a device, is not distinguishable from a change to a functional field, such as a routing table entry. Additionally, a single functional or logical change to the network can result in a variety of changes to multiple network entities, and the identification of the cause of the changes is often obscured by the appearance of these multiple changes.

It is an objective of this invention to provide a method and system that facilitates an identification of configuration differences between two models of a network. It is a further objective to provide a method and system that facilitates analysis of such configuration differences. It is a further objective of this invention to provide a method and system that facilitates the determination of possible causes of multiple changes to the network configuration.

These objectives and others are achieved by a system and method that provides a contextual and semantic analysis of each of a pair of network models to facilitate a mapping of network entities between the network models, and a contextual and semantic analysis of the changes between the paired network entities to facilitate analysis of the potential causes and effects of such changes. The system includes a plurality of refine handler and match handler pairs that are specific to the type, or class, of network entities being analyzed. Comparison 'rules' include one or more refine and match handler pairs and a difference handler that processes the output of these pairs. The refine handler analyzes the network model to identify the entities for which its rules apply, and the match handler processes these identified entities to establish a pairing between corresponding entities in each model. A sequence of refine-match processes are applied to the network models, typically in accordance with a hierarchy of rules until each entity is identified as a matched, added, or removed entity. A difference handler processes the identified pairings to provide a difference analysis that facilitates a meaningful interpretation of the configuration changes.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 1A:
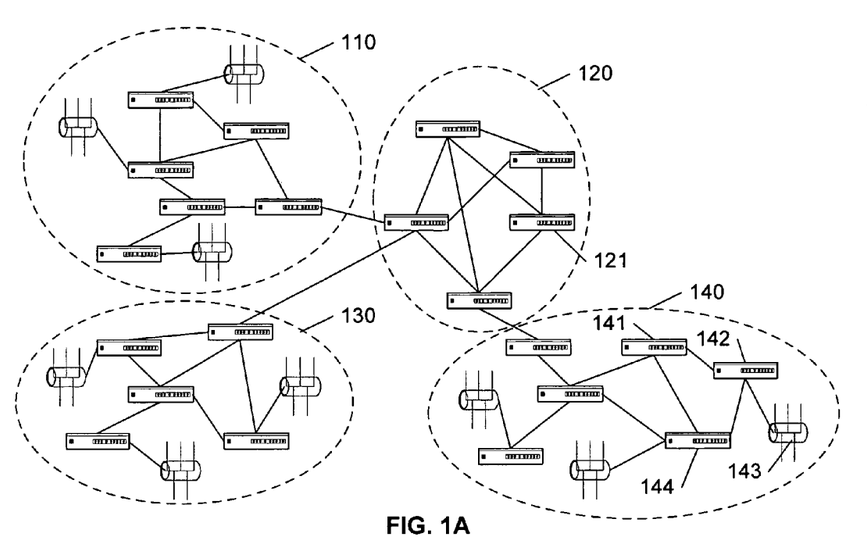
FIG. 1A illustrates an example block diagram of a network, with changes in FIG. 1B.

FIG. 1A illustrates a block diagram of a network, including sub-networks 110, 120, 130, 140. These sub-networks may be a physical and/or logical grouping of network entities, such as OSPF (Open Short Path First) areas, with sub-network 120 serving as the OSPF backbone area. Each sub-network 110-140 includes one or more routers, such as illustrated at 142, that provide wide-area networking access to individual local-area networks, such as illustrated at 143.

Figure 1B:
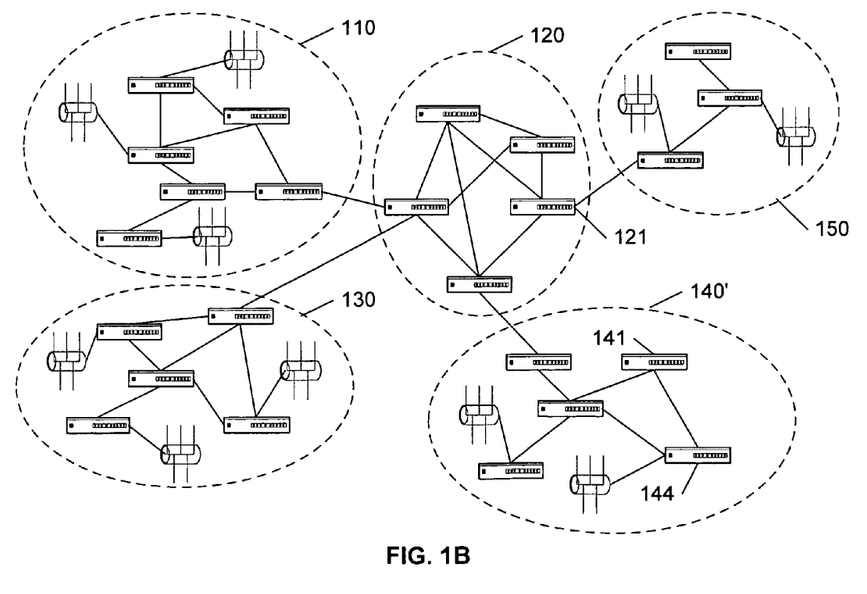

FIG. 1B illustrates a block diagram of the network of FIG. 1A with changes. In FIG. 1B, router 142 and local-area network 143 are removed, and a new sub-network 150 is added. The addition of the sub-network 150 introduces changes to the configuration of the router 121 in the backbone network 120, and the removal of the router 142 and local-area network 143 redefines the sub-network 140' and introduces changes to the routers 141 and 144. Other changes are also likely to occur, as various entities in the network potentially adjust their configurations to accommodate these changes.

The changes illustrated in FIG. 1B are very apparent, for ease of illustration and understanding, but one of ordinary skill in the art will recognize that other changes to the network may be less evident and/or have a less obvious effect. Even in this simple example, however, one will recognize that recognition of the different types of changes will facilitate an efficient analysis of these changes. That is, by recognizing that router 142 and its local-area network 143 have been removed, a detailed analysis of the configuration changes at routers 141 and 144 may be avoided, on the assumption that the changes merely reflect the removal of these entities; similarly, recognizing the addition of sub-network 150 obviates the need for a detailed analysis of the changes at router 121. In like manner, recognizing a likely cause of a change may also serve to identify anomalous changes. That is, for example, the addition of a sub-network 150 may be expected to cause a particular type of change, such as changes to particular parameters at the interfacing router 121. Or, the addition may be expected to cause a particular change to a given parameter's value. By recognizing the addition of sub-network 150, the specific change, or the type of change, at the router 121 may be compared to the expected change, or type of change, to assess whether the addition was effected properly.

In general, a preferred embodiment of this invention allows reporting differences in a network in terms of:
the addition and removal of devices from the network;
the differences in the configuration of a single device, or group of devices;
the changes caused in the overall network by a change, or a group of changes, to a device or group of devices, and
the changes caused in the overall network by an addition or removal of a device or group of devices.

To facilitate the above reporting functions, the network models are processed to:
refine/filter the entities in the networks to semantically identify each entity;
match/pair common entities in each network based on the semantic identification, and correspondingly identify added or removed entities; and
analyze the paired entities to identify differences.

Figure 2:
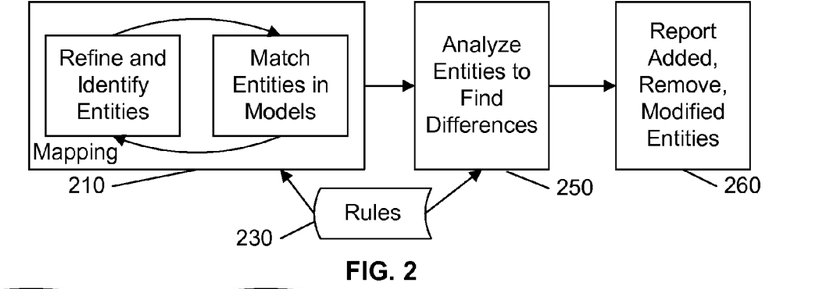
FIG. 2 illustrates an example flow diagram of a network configuration difference reporting system in accordance with this invention.

FIG. 2 illustrates an example flow diagram of an embodiment of this invention. At 210, the network models are processed to identify matching entities in each model; at 250, the matching entities are analyzed to identify and classify the differences between the models; and at 260, the added, removed, and modified entities are reported.

Identifying matching entities in a pair of network models is exacerbated by the fact that a network includes many different types of entities. Some entities correspond to physical devices, while others correspond to intangible entities, such as an OSPF routing instance running on a router, and still others correspond to a combination of physical, logical, and virtual entities, such as an OSPF area or a BGP autonomous system. Different types of changes may occur at each of the different types of entities, and therefore attempts to provide a 'global' change identification and classification process have generally failed, or have been extremely difficult to implement and maintain.

As illustrated in FIG. 2, the matching process 210 in a preferred embodiment of this invention includes a refining and matching process that iteratively/sequentially processes the models to progressively refine the matches and consequently identify unmatched entities that are present in only one model. Because the two models are generally temporally distinguished 'old' and 'new' models, these unmatched entities correspond to entities that are added to the new model or removed from the old model.

Each sequence through the refining-matching process 210 is preferably structured to identify paired entities in different network models based on content and semantic rules 230 that are specific to particular network entity types. These rules 230 may be explicit rules contained in a database that is accessed by the corresponding processes, or rules that are implicitly embodied within the processes, or a combination of both. As used herein, the term "rule" is used in the general sense, and does not necessarily imply that the processes are embodied as a "rule-based"system, per se. To facilitate the use of content and semantic rules that are specific to the particular system entities, these iterative/sequential refine-match processes may be embodied as multiple refine-match processes, each configured to apply a given set of rules. The rules 230 also define how the matched entities are compared to identify relevant differences between the entities, as discussed further below.

Figure 3:
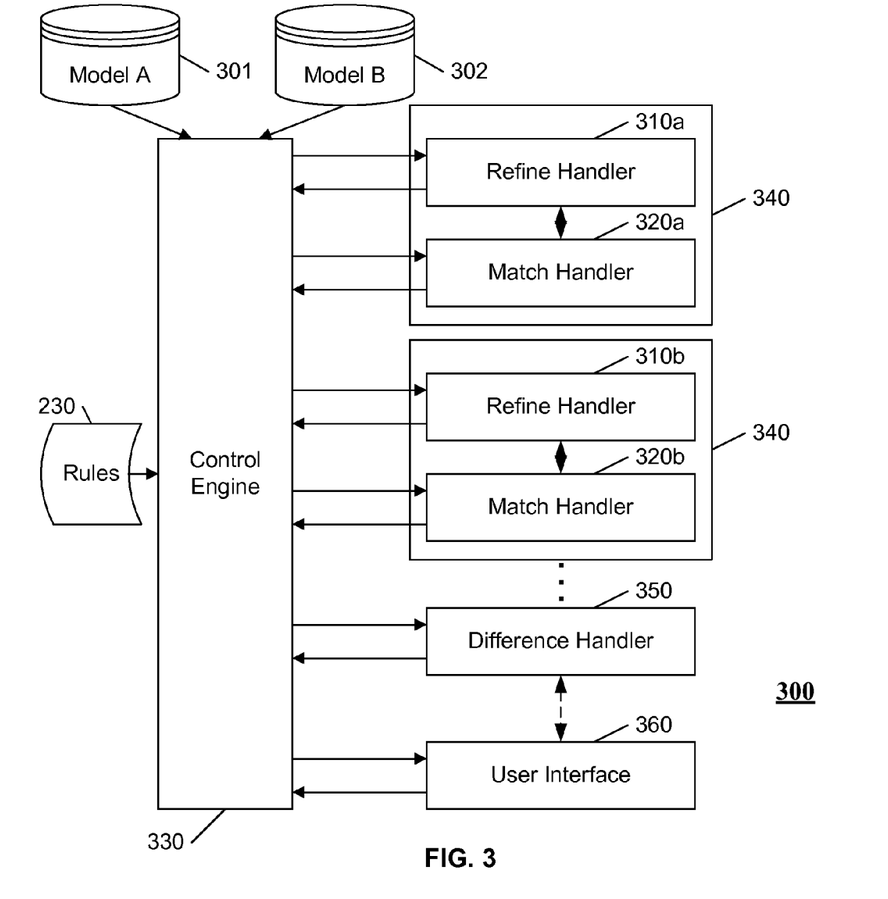
FIG. 3 illustrates an example block diagram of a network configuration difference reporting system in accordance with this invention.

FIG. 3 illustrates an example block diagram of a system 300 that includes a plurality of identification modules 340 that identify corresponding entities between two (or more) network models 301, 302. In an example embodiment, each identification module 340 includes a refine handler 310 (310a, 310b, . . .) and a match handler 320 (320a, 320b, . . .). The system 300 also includes a difference handler 350 that processes these corresponding and non-corresponding entities to provide information to a user interface 360 that facilitates efficient assessment and diagnosis of changes to the network configuration. A control engine 330 organizes the information and controls the interaction and flow of information among these components, based on the aforementioned rules 230.

Each refine handler 310 assigns a label to each of the network entities that it is configured to identify. That is, the refine handler 310 identifies the network objects that need to be processed according to the particular rules associated with the type of entity that the refine handler is configured to handle. For example, a refine handler 310 may be configured to identify all routers within a network, or all routers of a particular type, or of a particular configuration, such as all routers running an OSPF protocol. In like manner, the refine handler 310 may be configured to identify all devices that embody an OSPF process, or all devices operating under a particular operating system.

The refine handler 310 assigns a label to each entity within the group of entities that it is configured to process. The label assignment process is dependent upon the rules 230 associated with the particular group. For example, if the rule handler 310 is configured to identify all devices having a given operating system, it may assign a label to each device based on the device's operating system. If the rule handler 310 is configured to identify all entities running an OSPF process, it may assign a label to each entity based on the Area ID of each IP interface. As noted above, the rules 230 may be explicit or implicit rules, or a combination of both. Because the label assignment process is specific to each type of network entity, or groups of network entities, and because each of the models 301, 302 are processed by the same refine handlers 310, the likelihood of assigning the same label to the same entity in each model is very high. However, the assignment of a label is not necessarily unique to each identified object. That is, more than one object in each model may be assigned the same label, but it is very unlikely that the same object in each model would be assigned a different label by the refine handler 310.

The corresponding match handler 320 analyzes entities having the same label in each network and establishes a one-to-one mapping between the same entities in the two networks. Note that the matched 'entity' may include a plurality of 'sub-entities', and this one-to-one mapping will generally be at the particular 'entity-level', and does not necessarily imply a one-to-one mapping between each of the lower-level entities. Subsequent refine-match handlers will further establish mappings at the lower levels. For consistency in processing, added and removed entities are mapped to 'null' entities in the opposing model.

The control engine 330 controls the order in which the variety of refine handlers are used to analyze the configuration of all the devices and successively filtering down to the entities of interest. For example, if the differences in the OSPF Areas in a network are being analyzed, the control engine 330 selects the appropriate refine handler 310 to filter out the entities that do not have an impact on the OSPF organization of the network. Typically, such filtering includes filtering out non-routing devices and routers that are not running OSPF. After filtering, the refine handler 310 assigns a label that identifies each logical group, to facilitate comparison between the two networks. The label may be an arbitrary identifier, but in a preferred embodiment, is a meaningful and recognizable label, such as the string used by the respective protocol that organizes the network, such as "OSPF Area 0.0.0.3".

The refinement and identification of logical groups is not limited to merely finding a common element, such as a common OSPF area identification in each object forming the group. In a preferred embodiment, the refinement and identification includes, for example, analyzing the configuration of the respective protocol, analyzing the configuration of any related protocols that may have an impact, such as BGP Autonomous Systems containing OSPF Areas, analyzing physical connectivity of devices, as well as the logical connectivity of devices with respect to one or more protocols and with consideration for the OSI stack, such as IP connectivity super-imposed upon lower level Ethernet VLAN connectivity.

As noted above, the control engine 330 controls the selection of refine-match handler pairs 310-320 to effect various comparisons. The control engine in a preferred embodiment uses the rules 230 to explicitly or implicitly control the progressive refinement of the matching of objects between the network models. Note that although a single set of rules 230 is illustrated in the figures, one of ordinary skill in the art will recognize that multiple sets of rules may be used, with some of the rules being included within the different handlers 310, 320, 350, and/or that some or all of the rules 230 may be communicated directly or indirectly from the control engine 330 to the components 310, 320, 350, and so on.

The following example serves to illustrate how the control engine controls the processing of the models to determine the differences in Router IDs of each OSPF routing process on each device in the network.

Initially, each device in each model is identified by its hostname by a refine handler 310 identified by the rules 335 associated with this task. The control engine 330 compares the hostname labels from the compared models and determines which hostnames are added, removed, and common. The corresponding match handler 320 ignores the hostnames and the associated devices that are not common, and establishes a mapping between the devices having the same hostname; if multiple devices in the model have the same hostname then the match handler breaks the tie, preferably by the use of secondary rules 230 to establish a pairing between the same devices in the two networks. For example, the match handler 320 in this example may use the IP address of the Loopback interfaces of the devices as a secondary source of identifying information, such that devices from each model having the same IP address on their Loopback interface would be paired together. As can be seen, the rules 230 in this example are structured to provide a context and semantic based refinement and matching process based on the particular type of network entity being compared.

Based on the rules 230, the control engine 330 provides the identified common devices to a next refine handler 310 that is configured to identify each OSPF routing process on each common device by its Process ID. The control engine 330 compares the Process ID labels from the compared models and determines which Process IDs are added, removed, and common. The match handler ignores the added and removed Process IDs, and processes the elements with common Process IDs to establish a mapping between models, and breaks any ties among multiple objects having the same Process ID.

In this example, the system 330 differentiates between the same Process IDs on multiple devices because it keeps track of the hostname label that was previously assigned to each device. The label of the identified process is a combination of the device name and OSPF Process ID. Successive refine handlers of a rule append labels to each object as it is successively refined. The list of all labels assigned by all the refine handlers of a given rule set 230 ultimately identifies an object.

After processing the models through the appropriate set of refine-match handlers 310-320 as defined by the rule set 230, the control engine 330 communicates each identified pair of network objects, and their label, to the difference handler 350. The difference handler 350 compares each pair to identify and classify the differences. As in the other processes, the difference handler 350 preferably uses the explicit or implicit rules 230 to provide a context and semantic based identification and classification of the detected differences. In the above example, the difference handler 350 compares the Router ID of each of the paired processes and reports the difference, if any.

The difference handler 350 is preferably configured to report detected differences, as well as the classification, or type, of difference, for each of the affected network elements. In the above example, if the Router ID differs, the difference handler 350 will report that the process has been modified, and the type of modification is a change in the Router ID; additionally, the difference handler 350 will report that the device that includes the modified process has been modified, and that the type of modification includes a modification to a process of the device.

The user interface 360 is configured to present the results of the above processes to a user, and to allow the user to delve as deep as desired into any reported differences.

Figure 4:
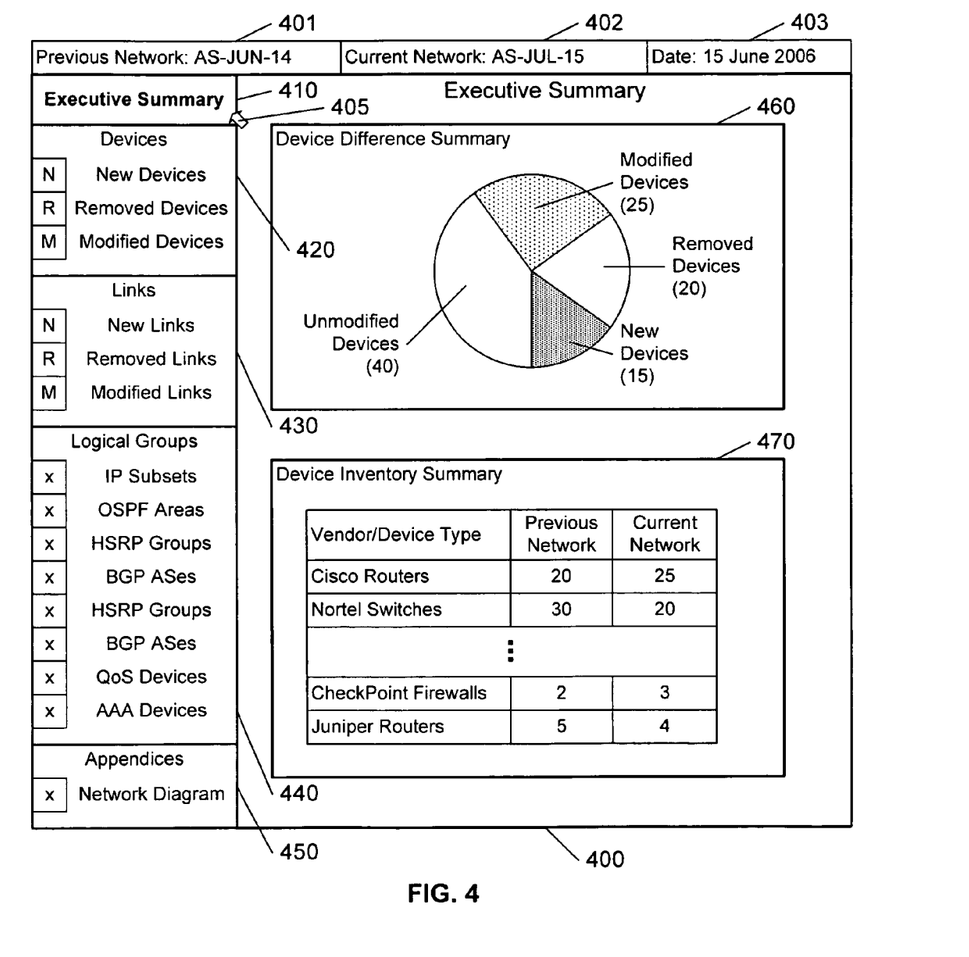
FIGS. 4 through 7 illustrate a variety of user interface displays for a network configuration difference reporting system in accordance with this invention.

FIG. 4 illustrates an example format of an input/output screen display 400 of the user interface 360. The display includes an identification of the models 401, 402 being compared, as well as other 'administrative' information, such as the date 403 that the display was produced. The display 400 includes a variety of selection panes 410, 420, 430, 440, and 450; one of ordinary art will recognize that additional or alternative information panes may be included, as well.

The pane 410 illustrates that an executive summary is available; this pane 410 may also be used to indicate the availability of other 'general purpose' or 'administrative' information, such as an introduction to the material, a tutorial, an index of symbols used, and so on.

The pane 420 illustrates that information based on the particular (physical) devices in the network is available, and is organized by new (added) devices, removed devices, and modified devices.

The pane 430 illustrates that information based on the particular (communication) links in the network is available, and is similarly organized by new links, removed links, and modified links.

The pane 440 illustrates that information based on logical groupings within the network is available, and is organized by the types of identified logic groups, including IP subnets, OSPF areas, HSRP groups, and so on.

The pane 450 illustrates the availability of ancillary information, such as a topological diagram of each of the network models 401, 402.

A cursor 405 is provided to allow the user to select from among these panes to control the content of the display. In FIG. 4, the user has selected the "Executive Summary" 410 to be displayed, as indicated by the 'bold' accent to the pane 410.

By selecting the Executive Summary 410, two example panes 460, 470 are displayed, which provide an overview of the differences between the models 401, 402. In pane 460, the number of unmodified, new, removed, and modified devices are illustrated in a pie-chart format. In pane 470, an inventory of devices in each of models 401, 402 is displayed.

The selection of each of the other panes 420, 430, 440, provides information regarding the detected differences related to each of the corresponding categories of devices, links, and logical groups. For example, selecting "New Devices" in pane 420 provides information regarding the detected devices that are in the current network 402, but not in the previous network 401, and selecting "Removed Devices" provides information regarding the detected devices that are in the previous network 401, but not in the current network 402. The information is generally organized as a hierarchy of information, as detailed further below, and the selection of an item in each of the panes 420, 430, 440 preferably provides a high-level summary of the lower-level differences, and allows further selections by the user to delve further into the details of each reported difference.

Figure 5:
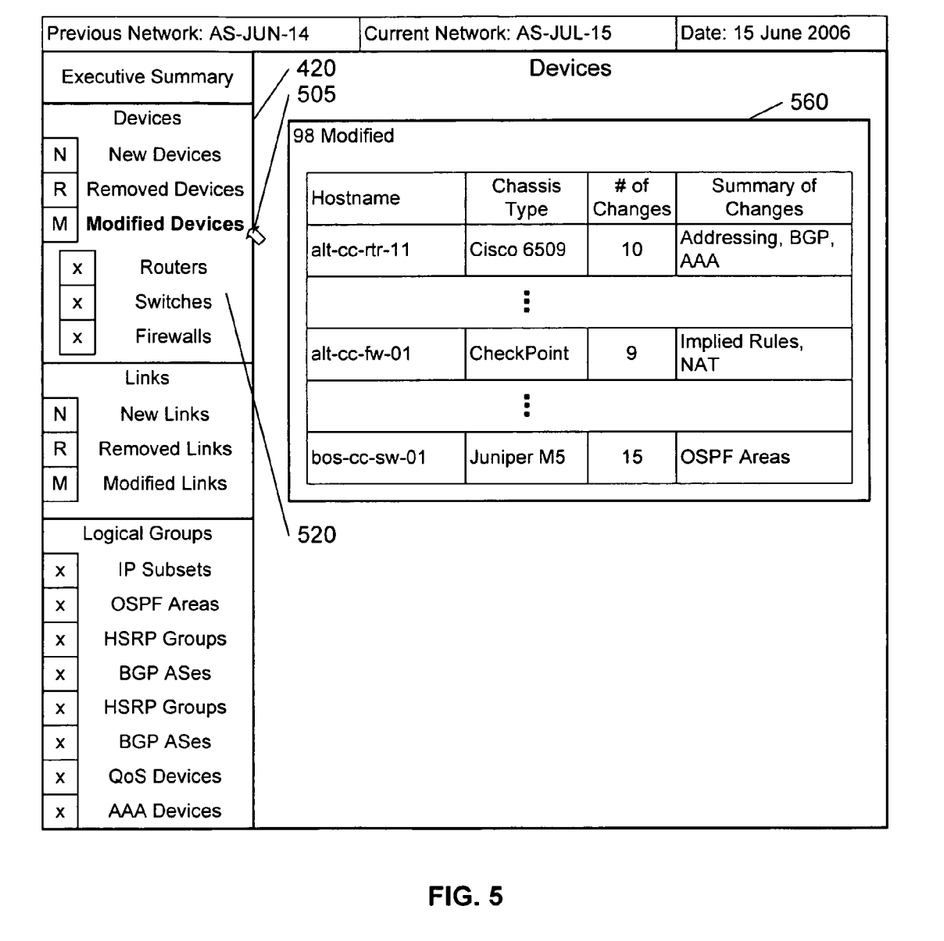

FIG. 5 illustrates a user's selection 505 of the 'Modified Devices' entry in the Devices pane 420. Upon selection of this entry, the system provides a display 560 of summary information related to the modified devices, as well as a menu 520 of selectable lower-level entries for obtaining more detailed information. That is, upon selection 505 of 'Modified Devices', pane 420 now indicates that the devices that are identified as being modified include routers, switches, and firewalls. As noted above, pane 560 provides summary information regarding changes to devices, and, for example, illustrates that 98 devices have been modified. It also indicates that within these 98 devices, a device with a hostname of "alt-cc-rtr-11" exhibits 10 changes, among which are "Addressing", "BGP", and "AAA" types of changes. The user may obtain further details regarding these summarized changes by selecting from among the displayed entries, particularly those in the selection panes on the left of the illustrated display. For example, when the user selects the "Routers" sub-menu 520, a list of the modified routers in the networks is displayed as a sub-sub-menu in the pane 420, and a summary of the changes to these routers is included as a pane at the right/center of the illustrated display.

Figure 6:
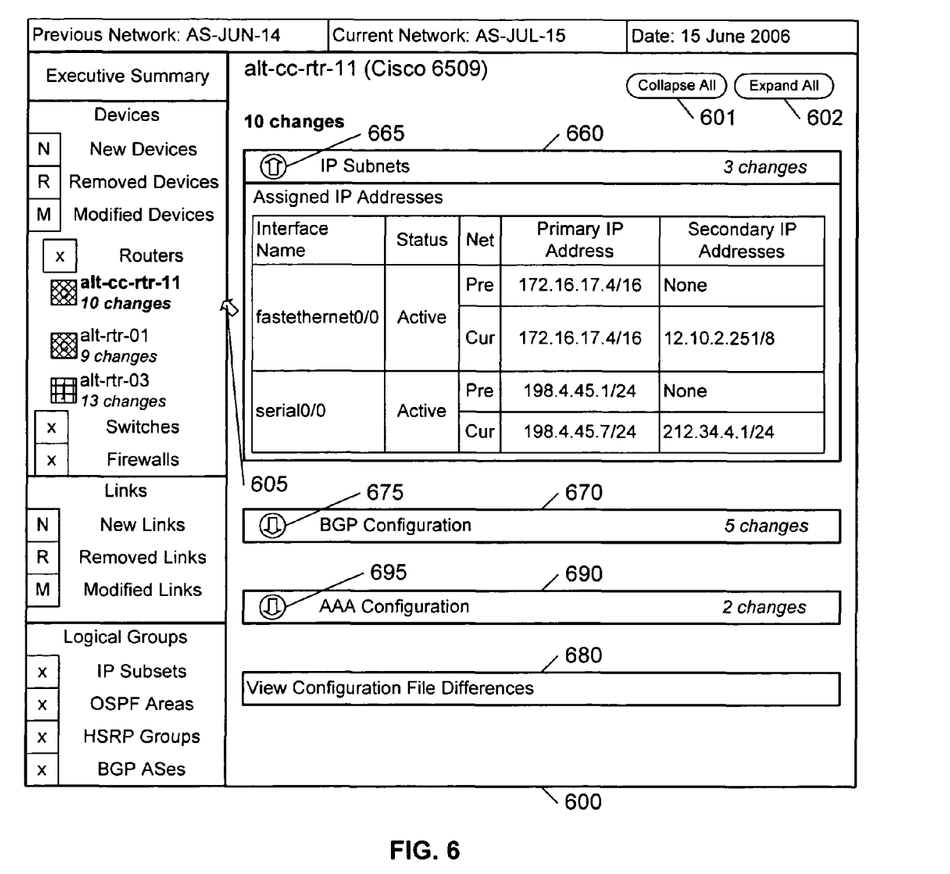

FIG. 6 illustrates a user's selection 605 of a modified router ("alt-cc-rtr-11") within a "devices>modified devices>routers" hierarchy of sub-menus. This selection provides the pane 600, which includes the details regarding the modifications to this router. The illustrated changes are organized by changes 660 to the IP Subnets of the router, changes 670 to the BGP Configuration of the router, and changes 690 to the AAA configuration of the router. These changes 660, 670, and 690 can be displayed in 'expanded' or 'collapsed' form, as indicated by changes 660, 670, and 690 respectively. User selectable keys 601, 602, 665, 675, 695 are used to select the desired form for all 601, 602 or individual 665, 675, 695 frames. Expanded frame 660 illustrates that two interfaces, "fastethernet0/0" and "serial0/0" on this router "alt-cc-rtr-11" have been modified, and identifies the previous and current primary and secondary IP addresses assigned to each of these interfaces. As can be seen, the change at fasteternet0/0 is the addition of a secondary IP address, and the change at serial0/0 is a new primary IP address, and the assignment of a secondary IP address.

The "View Configuration File Differences" selection frame 680 allows the user to view the actual contents of the configuration files that contain these changes, with the differing entries correspondingly highlighted.

As noted above, changes in a network configuration include changes to both physical entities as well as non-tangible/logical/virtual entities. The Links pane 430 of FIG. 4 allows a user to view changes as they affect pairs of interconnected devices, while the Logical Groups pane 440 of FIG. 4 allows a user to view changes from a logical/virtual point of view. The operation of the panes 430 and 440 is similar as described above for pane 420; as each menu item is selected, summary information is provided at the right/center pane, and sub-menus associated with the selected menu items are displayed in the left pane 430, 440. Selection of the IP Subnets menu item in pane 440, for example, provides a summary pane that identifies each modified IP Subnet, and the number of interfaces for each in the current and previous networks, and provides a sub-menu that allows the selection of "New" "Removed" or "Modified" IP Subnets.

Figure 7:
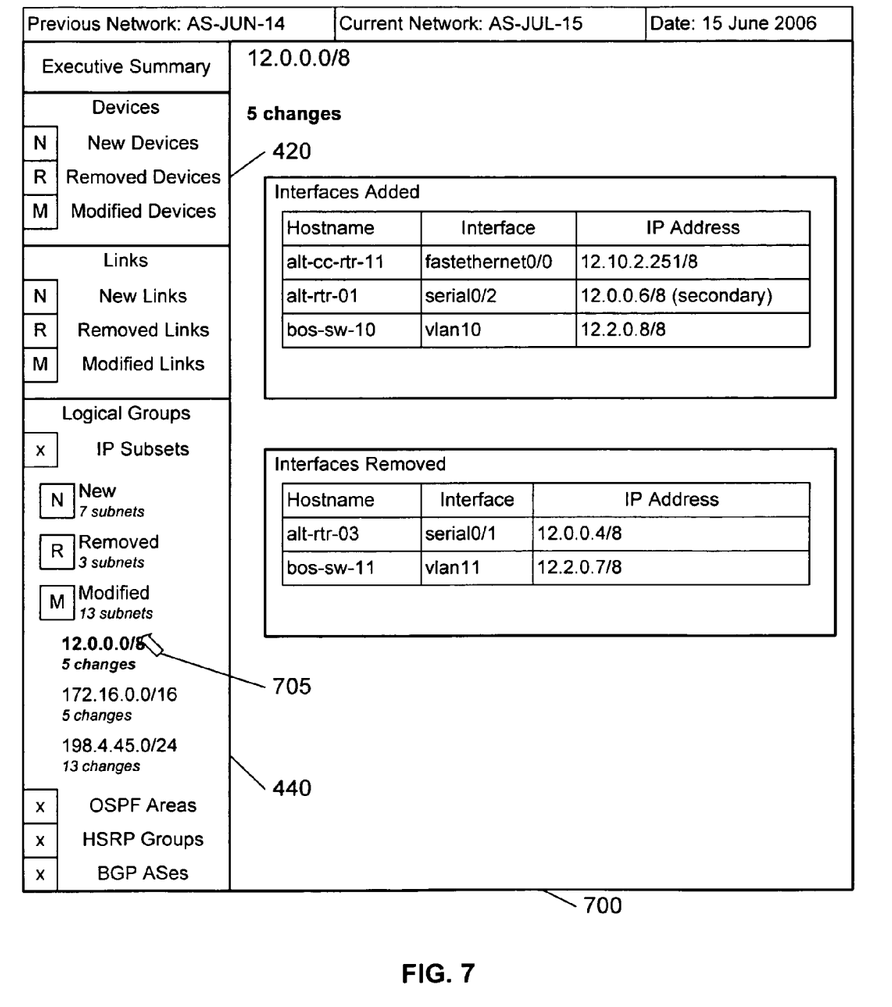

FIG. 7 illustrates a user's selection 705 of modified IP subnet "12.0.0.0/8" in the "Logical Groups>IP Subnets>Modified" hierarchy of menus in the pane 440. This selection provides a description of the changes to this IP subnet in the pane 700.

It is significant to note that the changes illustrated in FIG. 7 would be found by tracing the changes through the "Devices" pane 420 as discussed above, for changes to the router "alt-rtr-01" or the switch "bos-sw-10". That is, by providing rules that identify differences based on the types of network entities, the system is able to provide different 'views' of the same information, to facilitate understanding and diagnoses of the configuration changes.

The foregoing merely illustrates the principles of the invention. It will thus be appreciated that those skilled in the art will be able to devise various arrangements which, although not explicitly described or shown herein, embody the principles of the invention and are thus within its spirit and scope. For example, in the example embodiment of FIG. 3, the refine handler 310 and the match handler 320 are structured as separate elements, with the control engine 330 configured to manage the flow of information between them. One of ordinary skill in the art will recognize that the refine handler 310 could be configured to communicate directly with the match handler 320, or that the refine and match processes could be included in a single handler. In like manner, the user interface 360 could receive the difference information directly from the difference handler 350, and each of these processes 350, 360 could be included in a single processing component. These and other system configuration and optimization features will be evident to one of ordinary skill in the art in view of this disclosure, and are included within the scope within the spirit and scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements, and can include an immeasurable number of elements.

We claim:

1. A method comprising:
mapping, by a data processing machine, entities of a first network model to a second network model, the second network model having a different arrangement of entities than the first network model, and the mapping establishes a correspondence between corresponding entities in each model,
identifying, by the machine, added, removed, and matched entities based on the mapping,
comparing, by the machine, the matched entities to identify modified entities having one or more configuration differences, and
reporting, by the machine, configuration differences between the first and second network models based on the added, removed, and modified entities,
wherein:
each of the first and second network models provides a high-fidelity representation of the actual network, and includes representations of physical devices and links between the devices,
the mapping includes a sequence of refinements of objects in each of the first and second network models,
the sequence of refinements correspond to mapping to different network entities,
each refinement is based on a set of rules associated with the network entity corresponding to the refinement,
the mapping at each refinement includes providing a label to each network object associated with the network entity,
combining each label from each refinement of the sequence of refinements to identify each network object by a composite label, and
identifying the matched entities in each of the first and second network models as those having the same composite label.

2. The method of claim 1, wherein the entities include physical entities and logical entities.

3. The method of claim 2, wherein the logical entities include logical groups.

4. The method of claim 3, wherein the logical groups include at least one of: IP Subnets, OSPF Areas, HSRP Groups, BGP ASes, QoS Devices, and AAA Devices.

5. The method of claim 2, wherein the physical entities include the physical devices.

6. The method of claim 5, wherein the entities include the links between the physical devices.

7. The method of claim 1, wherein reporting the configuration differences includes providing an interactive user interface.

8. The method of claim 7, wherein the user interface includes a plurality of menu panes, each menu pane being associated with a predefined type of entity.

9. The method of claim 8, wherein
each menu pane is configured to facilitate a selection from among a plurality of options, and the method includes, upon selection of an option:
providing information about one or more network entities, and
providing a sub-menu containing additional options.

10. The method of claim 8, wherein the predefined types of entities include physical entities and logical entities.

11. The method of claim 10, wherein the logical entities include logical groups.

12. The method of claim 11, wherein the logical groups include at least one of: IP Subnets, OSPF Areas, HSRP Groups, BGP ASes, QoS Devices, and AAA Devices.

13. The method of claim 8, wherein the physical entities include the physical devices.

14. The method of claim 13, wherein the predefined types of entities include the links between the physical devices.

15. A system comprising:
a plurality of identification modules, each identification module being configured to identify select matching entities of a first network model and a second network model, based on rules that are specific to the select entities, the second network model having a different arrangement of entities than the first network model, and the identification module establishes a correspondence between corresponding entities in each model, and
a control engine that is configured to selectively enable each identification module in a sequence that effects an identification of each of the entities of the first network model and the second network model, and
a difference processor that is configured to compare entities having corresponding identifications in each of the first and second network models, to determine configuration differences between corresponding entities of the first and second network models,
wherein
each of the first and second network models provides a high-fidelity representation of the actual network, and includes representations of physical devices and links between the devices,
identifying select matching entities includes a sequence of refinements of objects in each of the first and second network models,
the sequence of refinements correspond to mapping to different network entities,
each refinement is based on a set of rules associated with the network entity corresponding to the refinement, and
the mapping at each refinement includes:
providing a label to each network object associated with the network entity,
combining each label from each refinement of the sequence of refinements to identify each network object by a composite label, and
identifying the matching entities in each of the first and second network models as those having the same composite label.

16. The system of claim 15, wherein the control engine is configured to selectively enable each identification module to progressively refine the identification of each entity in each of the first and second network models.

17. The system of claim 15, wherein each identification module includes:
a refine handler that is configured to provide an identification of each of the select entities in each of the first and second network models, and
a match handler that is configured to compare entities in the first and second network models having corresponding identifications to further refine the identifications.

18. The system of claim 17, wherein the refine handler is configured to:
select the select entities for each identification module based on the rules, and
provide the identification based on the rules.

19. The system of claim 18, wherein the match handler is configured to refine the identification based on the rules.

20. The system of claim 17, wherein the match handler is configured to refine the identification based on the rules.

21. The system of claim 17, wherein the control engine is configured to create a composite identifier of one or more entities, based on the identifier provided by the refine handler and match handler during the sequence of comparisons.

22. The system of claim 15, wherein the difference processor is configured to distinguish changed entities, added entities, and removed entities.

23. The system of claim 15, wherein the entities include physical entities and logical entities.

24. The system of claim 23, wherein the logical entities include logical groups.

25. The system of claim 24, wherein the logical groups include at least one of: IP Subnets, OSPF Areas, HSRP Groups, BGP ASes, QoS Devices, and AAA Devices.

26. The system of claim 23, wherein the physical entities include the physical devices.

27. The system of claim 26, wherein the entities include the links between the physical devices.

28. The system of claim 15, including an interactive user interface that is configured to report the configuration differences.

29. The system of claim 28, wherein the user interface includes a plurality of menu panes, each menu pane being associated with a predefined type of entity.

30. The system of claim 29, wherein
each menu pane is configured to facilitate a selection from among a plurality of options, and the system includes, upon selection of an option:
providing information about one or more network entities, and
providing a sub-menu containing additional options.

31. The system of claim 29, wherein the predefined types of entities include physical entities and logical entities.

32. The system of claim 31, wherein the logical entities include logical groups.

33. The system of claim 32, wherein the logical groups include at least one of: IP Subnets, OSPF Areas, HSRP Groups, BGP ASes, QoS Devices, and AAA Devices.

34. The system of claim 31, wherein the physical entities include physical devices.

35. The system of claim 34, wherein the predefined types of entities include links between the physical devices.

* * * * *